UNITED STATES PATENT OFFICE 2,001,418

ACRIDONE DIANTHRIMIDE VAT DYESTUFFS AND THEIR PRODUCTION

Ivan Gubelmann and Robert J. Goodrich, South Milwaukee, and William Dettwyler, Milwaukee, Wis., assignors, by mesne assignments, to E. I. du Pont de Nemours & Company, a corporation of Delaware No Drawing. Application April 30, 1931,
Serial No. 534,134

17 Claims. (Cl. 260—37)

This invention relates to a process of condensing a halogen anthraquinone acridone containing halogen in the Bz nucleus of the acridone group as well as in an alpha position of the anthraquinone nucleus, with an alpha amino anthraquinone.

This invention also relates to the products produced by the process and includes their substitution products and derivatives.

It is an object of this invention to provide a method of preparing anthraquinone derivatives which may be regarded as alpha, alpha'-dianthrimides and in which one anthraquinone residue forms part of an anthraquinone-acridone residue of the following structure

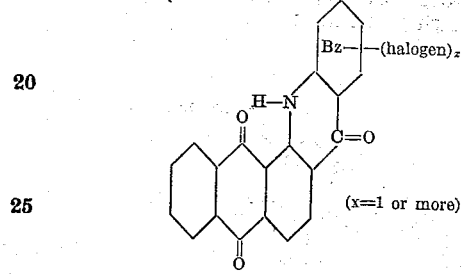

(x=1 or more)

and the other anthraquinone residue may or may not be substituted.

Our method generally consists in reacting an anthraquinone-acridone body of the above general formula and containing further a halogen atom in an alpha position of the anthraquinone nucleus, with an alpha-amino-anthraquinone body, preferably in the presence of acid binding agents and copper catalysts.

When applied specifically to Bz-dichloro-4-chloro-1(N),2-anthraquinone-acridone and α-amino-anthraquinone, the reaction may be illustrated by the following equation:

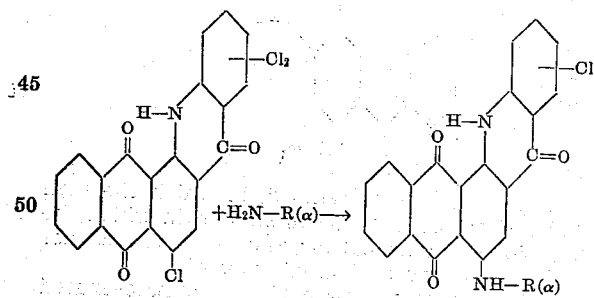

wherein R stands for an anthraquinone residue, substituted or not.

The products of our invention are in themselves dyestuffs but can also be used as intermediates for the preparation of other vat dyestuffs. The Bz-halogen acridonyl alpha-alpha'-dianthrimides of our invention are distinguishable from and superior to the similar acridonyl alpha-alpha'-dianthrimides not containing halogen in the Bz ring because of their commercially valuable shades and their good fastness properties. One of their most important qualities is that they are capable of being converted into other very valuable dyestuffs.

It is known in the literature that polyhalogen anthraquinone-acridones containing three or more halogens in the molecule are converted into products containing lesser amounts of halogen upon heating to high temperatures with organic or inorganic bases or salts of weak acids in the presence of a copper salt. For example, a trichlor-anthraquinone-acridone heated in nitro benzene in the presence of sodium acetate and copper oxide is converted into a mixture of mono and dichloro-anthraquinone-acridones. We have now found that this reaction can be made to proceed in another direction where the base employed is an amine such as alpha amino anthraquinone, its derivatives or substitution products. More specifically, when the starting materials employed are halogenated 1,2-anthraquinone-acridones, which in addition to containing halogen in the Bz ring of the acridone group also contain halogen in an alpha position of the anthraquinone residue, the final product is a 1,2-acridonyl-alpha, alpha'-dianthramide. This reaction was not to be foreseen since it is known in the art that Bz-halogen anthraquinone-acridones readily react with amino-anthraquinones exchanging one of the Bz-halogens for the amino-anthraquinone residue. It was therefore to be expected that in the case of halogen-anthraquinone-acridone bodies containing halogen in the anthraquinone residue as well as in the Bz nucleus, Bz-substitution would take place at least to some extent, if not exclusively.

As a result of this preferential reaction of the alpha amino anthraquinones with the halogen in the alpha position of an anthraquinone residue containing an acridone ring there is opened up a field of entirely new dyestuffs possessing outstanding properties such as new shades possessing excellent fastness qualities.

The following examples are illustrations of the manner of effecting the above reaction. These examples are merely representative of the general process of our invention, and we do not propose

Example 1

20 parts of tri-chloro-anthraquinone-acridone prepared by passing chlorine into 1(N),2-anthraquinone-acridone suspended in nitrobenzene in the presence of a small amount of iodine at 100° C. until evolution of HCl ceased (chlorine content 23-24%), are added to 200 parts of nitrobenzene. There are next added 12 parts of alpha-amino-anthraquinone, 20 parts of sodium carbonate, and 6 parts of verdigris. This mass is heated to the reflux temperature with stirring for about 5 hours. It is then cooled to room temperature, filtered, and the filter cake washed with a small amount of nitrobenzene, and finally with alcohol. It is then dried. The dark powder obtained is soluble in concentrated sulphuric acid with a reddish brown color and to the best of our understanding corresponds to the following formula:

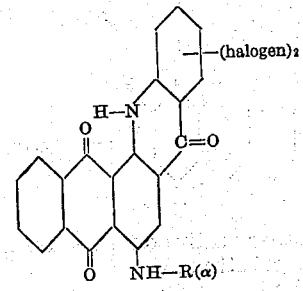

It dyes cotton from a bluish violet vat in gray shades.

Example 2

To 200 parts of nitro benzene are added 20 parts of the halogenated anthraquinone acridone (prepared as in Example 1), 13 parts of 1-amino-2-methyl-anthraquinone, 20 parts of soda ash, and 6 parts of verdigris. The mass is refluxed for 5 hours under agitation. It is then cooled to room temperature, filtered, and the filter cake washed with a small amount of nitro-benzene and finally with a little alcohol, and then dried. The product obtained is soluble in concentrated sulphuric acid with a red brown color and dyes cotton from a bluish violet vat in gray shades. The product obtained has most probably the following formula:

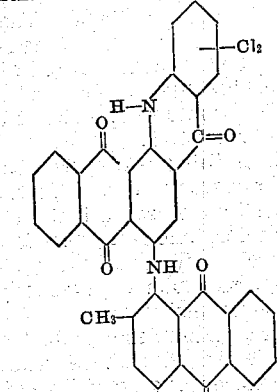

We are aware that the conditions effecting the anthrimide condensation may be altered considerably to produce similar results and we do not propose to limit our invention to the specific methods set forth in the examples. For example, other high boiling diluents than nitro-benzene may be used as well as other temperatures of reaction and other copper salts than verdigris. Similarly, instead of the particular amino-anthraquinone bodies disclosed, other alpha-amino-anthraquinone bodies may be used, provided of course they contain no substituents which are more reactive toward halogen than the amino group, as will be obvious to anyone skilled in the art. Moreover, in view of our discovery that the reaction is one of anthrimide formation, in other words, in view of the fact that halogen in the alpha position of the anthraquinone nucleus is replaced by an anthraquinonyl amine residue in preference to the halogen in the Bz nucleus of the acridone ring, any method suitable for making anthrimides may be used without departing from the scope of the invention.

We claim as our invention:

1. The process of preparing a 1,2-acridonyl alpha-alpha'-dianthrimide containing halogen in the Bz nucleus which comprises heating an alpha amino anthraquinone with a poly-halogen anthraquinone-1,2-acridone having halogen in the Bz nucleus and in an alpha position on the anthraquinone nucleus.

2. The process of claim 1, in which the reaction is carried out in the presence of a high boiling inert solvent, a copper catalyst and an acid binding agent.

3. The process of preparing a compound having the following formula:

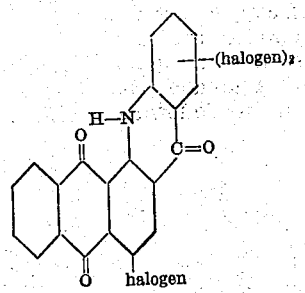

in which R represents an anthraquinone nucleus, which comprises heating an alpha amino anthraquinone in a high boiling inert solvent with a compound having the following formula:

4. The process of claim 3, in which the high boiling solvent is nitrobenzene and in which the reaction is carried out in the presence of a copper catalyst and an acid binding agent.

5. The process of preparing a Bz halogenated 1,2-acridonyl-4-alpha'-dianthrimide, which comprises heating an alpha amino anthraquinone with a tri-halogen anthraquinone acridone having the following formula:

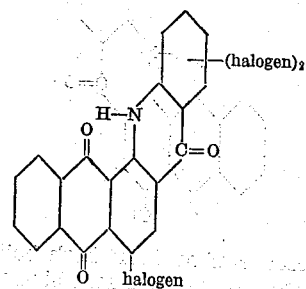

in the presence of a high boiling inert solvent, a copper catalyst and an acid binding agent.

6. The process of preparing a compound having the following formula:

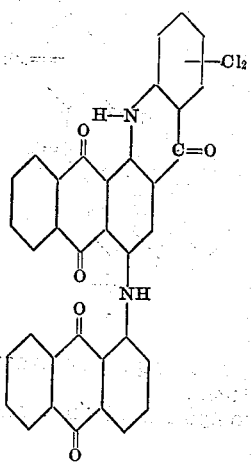

which comprises heating alpha amino anthraquinone with a tri-chloro anthraquinone acridone having the following formula:

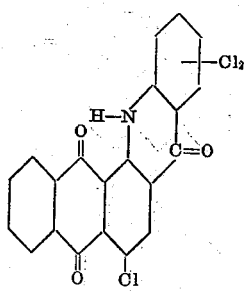

in the presence of a high boiling inert solvent, a copper catalyst and an acid binding agent.

7. The process according to claim 6, in which the reaction is carried out in the presence of nitro-benzene, verdigris and sodium carbonate.

8. Bz-halogenated 1,2-acridonyl alpha, alpha'-dianthrimides.

9. Bz-halogenated 1,2-acridonyl 4-alpha'-dianthrimides having the following general formula:

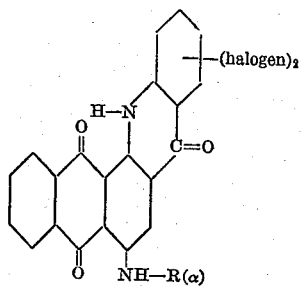

in which R is an anthraquinone nucleus.

10. Bz-chlorinated 1,2-acridonyl 4-alpha'-dianthrimides having the general formula:

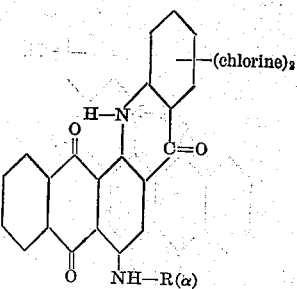

in which R is an anthraquinone nucleus.

11. A Bz-chlorinated 1,2-acridonyl 4-alpha'-dianthrimide having the following general formula:—

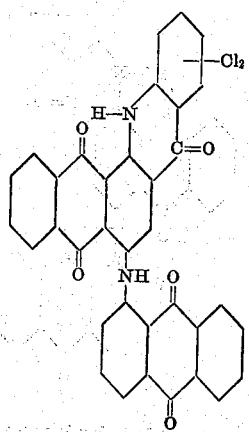

12. The process of preparing compounds of the following formula

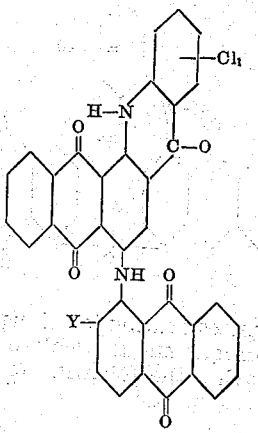

wherein Y stands for hydrogen or a methyl group which comprises heating an amino-anthraquinone having the following formula:

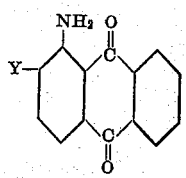

with a tri-chloro-anthraquinone acridone of the following formula:

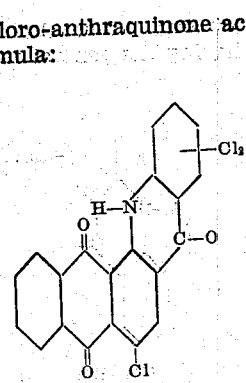

13. Bz-chlorinated 1,2-acridonyl 4-alpha'-dianthrimides having the following general formula:

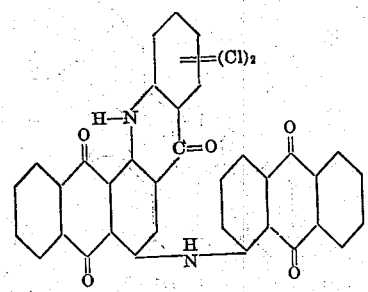

wherein Y stands for hydrogen or a methyl group.

14. The process of preparing a compound having the following general formula

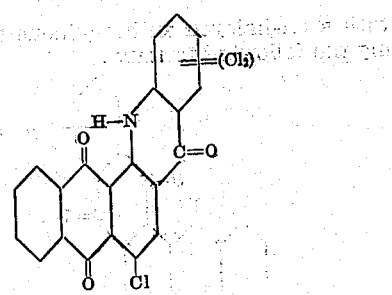

which comprises heating to boiling with an alpha amino anthraquinone a trichloro anthraquinone acridone having the following formula

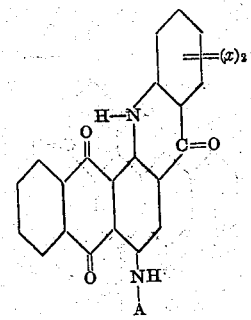

in the presence of an inert high boiling solvent, a copper catalyst and an acid binding agent.

15. The process according to claim 14 in which the inert high boiling solvent is nitrobenzene.

16. The compounds of the following general formula

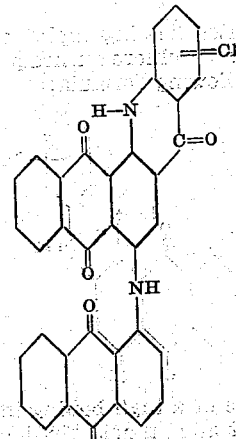

in which A is an alpha anthraquinone radical and X is halogen.

17. The compound of the following general formula

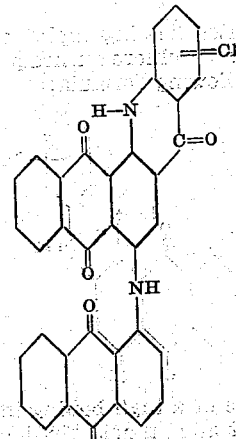

IVAN GUBELMANN.
ROBERT J. GOODRICH.
WILLIAM DETTWYLER.

Certificate of Correction

Patent No. 2,001,418.  May 14, 1935.

IVAN GUBELMANN ET AL.

It is hereby certified that error appears in the printed specification of the above numbered patent requiring correction as follows: Page 3, second column, line 46, claim 12, at the extreme upper right corner of the formula, for "$Cl_1$" read $Cl_2$; and that the said Letters Patent should be read with this correction therein that the same may conform to the record of the case in the Patent Office.

Signed and sealed this 18th day of June, A. D. 1935.

[SEAL]

LESLIE FRAZER,
*Acting Commissioner of Patents.*